Sept. 23, 1958     M. C. DEPP     2,852,859
FLUX VALVE COMPENSATING SYSTEM
Filed July 10, 1956     4 Sheets-Sheet 1

AIRCRAFT ON MAGNETIC NORTH HEADING AND IN
LEVEL UNACCLERATED FLIGHT AT APPROX 40° N.LAT.

$H_E$ - TOTAL MAGNETIC FIELD OF EARTH
$H_P$ - TOTAL MAGNETIC FIELD OF AIRCRAFT PRODUCED BY
    HARD IRON (PERMANENT FIELD), SOFT IRON, EDDY CURRENTS ETC.

l - AIRCRAFT LONGTIDUNAL AXIS (FORWARD)
t - AIRCRAFT TRANSVERSE AXIS (RIGHT WING)     $\gamma$ - DIP ANGLE
v - AIRCRAFT VERTICAL AXIS (DOWN)     A,B,C - FLUX VALVE LEGS i - EARTH'S MAGNETIC HORIZONTAL AXIS (NORTH)
j - EARTH'S MAGNETIC HORIZONTAL AXIS (EAST)
k - EARTH'S MAGNETIC VERTICAL AXIS (DOWN)

a - FLUX VALVE LONG AXIS (FORWARD)
b - FLUX VALVE TRANSVERSE AXIS (RIGHT WING)
c - FLUX VALVE VERTICAL AXIS (DOWN)

INVENTOR
MARLIN C. DEPP
BY
ATTORNEY

Sept. 23, 1958     M. C. DEPP     2,852,859

FLUX VALVE COMPENSATING SYSTEM

Filed July 10, 1956     4 Sheets-Sheet 3

INVENTOR
MARLIN C. DEPP
BY
ATTORNEY

Sept. 23, 1958     M. C. DEPP     2,852,859
FLUX VALVE COMPENSATING SYSTEM Filed July 10, 1956     4 Sheets-Sheet 4

INVENTOR
MARLIN C. DEPP
BY
ATTORNEY

United States Patent Office 2,852,859
Patented Sept. 23, 1958

2,852,859

FLUX VALVE COMPENSATING SYSTEM

Marlin C. Depp, Peekskill, N. Y., assignor to Sperry Rand Corporation, a corporation of Delaware Application July 10, 1956, Serial No. 596,906

13 Claims. (Cl. 33—225)

The present invention relates generally to devices for determining the direction of the earth's magnetic field and more particularly to magnetic compass devices of the type known in the art as flux valves. An example of such a magnetic field detection device may be found in U. S. Patents 2,383,460 and 2,383,461 issued August 28, 1945 and assigned to the same assignee as the present invention. Such devices may be used directly as a direction reference or as a direction reference slaved gyro-magnetic compass structure. A typical system of the latter type is disclosed in U. S. Patent 2,357,319 issued September 5, 1944 which patent is assigned to the same assignee as the present invention. The high accuracy requirements placed on a compass system by present day bombing, navigation, and photo flight-line equipments have dictated the need for extreme accuracy in the measurement of the azimuthal heading of the vehicle and small errors, heretofore considered negligible, must now be determined and accurately compensated. Furthermore, the magnetic azimuth detectors or flux valves are usually located in the aircraft with which they are associated in such a manner that it is nearly impossible to apply corrections at the detector site after they have been installed so that as a consequence a new system or method is required that will allow precise adjustment of the compass system, preferably from the air crew compartment.

Heretofore, heavy bomber or large cargo-type aircraft ground swinging, i. e., the determination of the proper orientation of the flux valve within the aircraft and the determination of extraneous magnetic fields produced within or by the aircraft, has been accomplished by swinging the aircraft on the ground, that is, rotating the aircraft to various headings, determining the magnitude and direction of any errors in the flux valve reading and then compensating the flux valve for these errors. A method by which the magnitude and direction of the above-noted errors may be determined is described in detail in my co-pending joint application S. N. 567,203 filed February 23, 1956 for Method of Measuring and Compensating for Deviation Errors for Earth's Field Responsive Instruments, which application is also assigned to the same assignee as the present invention. The apparatus by which the flux valve is compensated after the errors have been determined is the subject matter of the present invention.

In most modern aircraft, accurate heading information is received from a directional gyro which is slaved to a remote compass transmitter. One type of remote compass transmitter is a flux value, which is so designed that the sensitive element thereof ideally senses only the horizontal component of the earth's magnetic field, that is, the flux valve is so mounted in the aircraft that the pick-up or output windings thereof are maintained substantially horizontal. The aircraft's magnetic heading is the angular difference between the horizontal component of the earth's magnetic field and the horizontal projection of the aircraft's longitudinal axis. A typical slaved gyro-magnetic compass system is described in detail in the above-mentioned U. S. Patent No. 2,357,319. In practice however, there exists the possibility of errors in the compass system which result principally from two causes (a) the interaction of various magnetic fields originating in the aircraft's structure with the earth's magnetic field and (b) the tilting of the flux valve out of the horizontal plane so that the flux valve output includes a portion of the vertical component of the earth's magnetic field. These two types of flux valve errors may be considered as static errors and dynamic errors respectively.

It is the principal object of the present invention to provide a means whereby the above errors may be greatly reduced or substantially eliminated.

It is another object of the present invention to provide a flux valve compass system wherein both static and dynamic errors in the measurement of the horizontal component of the earth's magnetic field may be substantially reduced or eliminated by means of apparatus located remotely from the flux valve and preferably within the pilots' or navigator's compartment.

The sensitive element of a flux valve consists essentially of a core element of highly permeable material upon which are wound suitable energizing and output or pick-up windings. This core element is generally in the shape of an equiangular Y, the pick-up coils being mounted on the legs of the core, and the assembly being maintained generally horizontal by means of a pendulous mass and gimbal support. However, it will be understood that a cruciform of a delta-shaped core element may alternatively be employed. The flux valve is so excited that each pick-up coil senses a component of any magnetic field in which it lies and the three coils together sense that portion of any magnetic field in the plane of the coils. Since these coils sense any magnetic fields in which they lie, the output of the coils may be in error due to the magnetic fields produced by the aircraft's structure itself or by the sensing of a portion of the vertical component of the earth's magnetic field.

It is a further object of the present invention to compensate a flux valve compass of the type referred to by supplying controlled direct current or unidirectional voltages to each of the affected windings of the flux valve such that the windings themselves generate magnetic fields which are equal and opposite to the error causing fields thereby removing the effects of the latter fields from the output of the pick-up windings of the flux valve.

Other objects and advantages of the present invention not at this time particularly enumerated will become apparent as a description of preferred embodiments of the present invention proceeds, reference being made to the accompanying illustrative drawings wherein.

Figure 3:
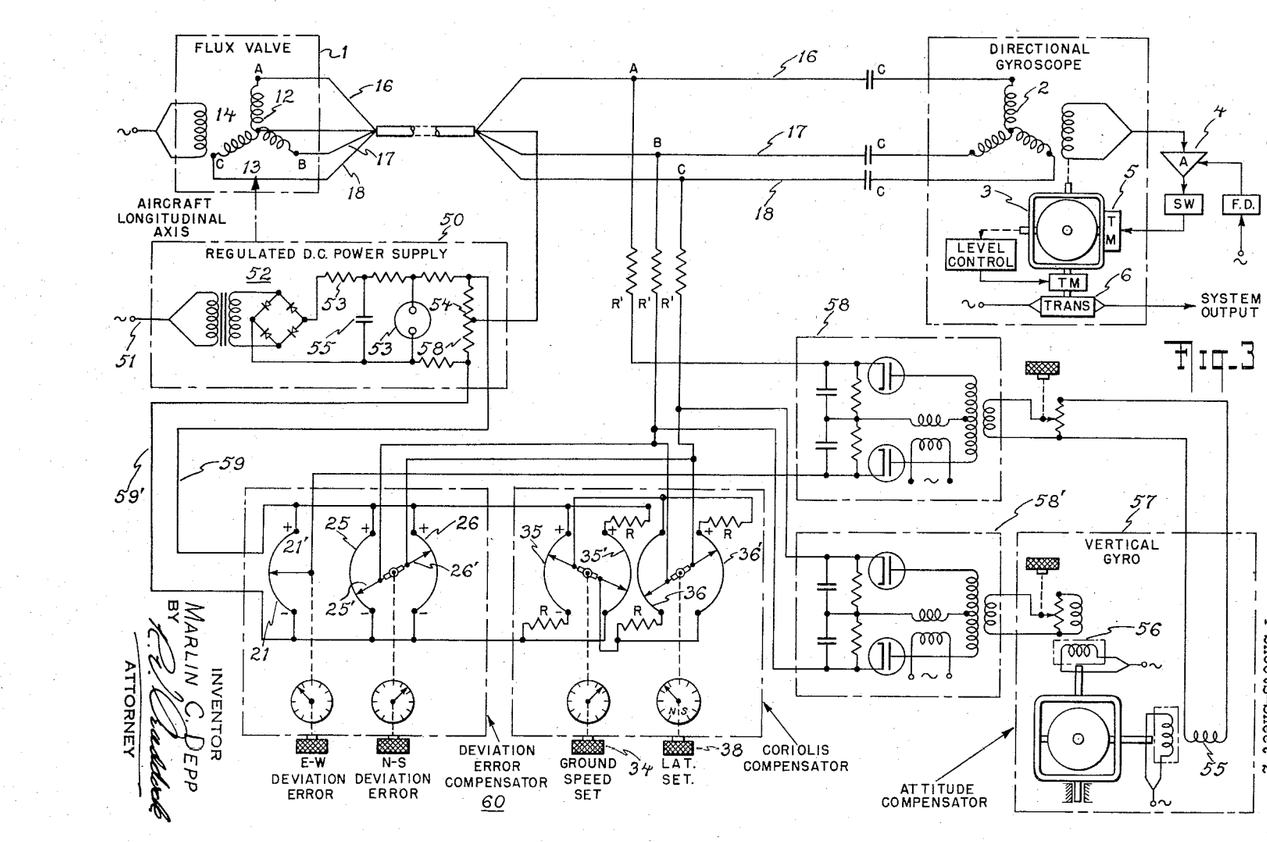
Fig. 3 is a schematic representation of a typical slaved gyromagnetic compass system illustrating the compensation apparatus of the present invention.

Referring first to Fig. 3 and particularly to the upper portion thereof there is illustrated a typical magnetically slaved directional gyro compass system of the type described in detail in the above mentioned U. S. Patent No. 2,357,319. Generally, the system comprises a remote compass transmitter such as for example a flux valve 1, which will be hereinafter described in more detail, which supplies an electrical output signal proportional to the direction or orientation of the longitudinal axis of the aircraft with respect to the direction of the horizontal component of the earth's magnetic field. A synchro control transformer 2 having its rotor mechanically driven or otherwise positioned by a directional gyro 3 receives the output of the flux valve in its stator and any difference between the position of the gyro spin axes and the direction of the magnetic vector in the stator results in an electrical signal output from the rotor thereof which is amplified in slaving amplifier 4 and applied to a torque motor 5 on the horizontal axis of the gyro which will precess the gyro in a direction and an amount such as to maintain alignment between the gyro spin axis and the direction of the earth's field. A leveling system of any conventional type maintains the gyro spin axis substantially horizontal. A signal transmitter 6 is provided for supplying space stabilized magnetic heading data to utilization apparatus in the aircraft such as for example, heading repeaters, navigational computers, autopilots and the like.

A number of different types of compass systems operate in response to the direction of the earth's magnetic field and the apparatus of the present invention by means of which the flux valve or magnetic detector errors are compensated is applicable to any of them and it is to be understood that the slaved compass system illustrated should be considered as exemplary rather than limiting.

Figure 1:
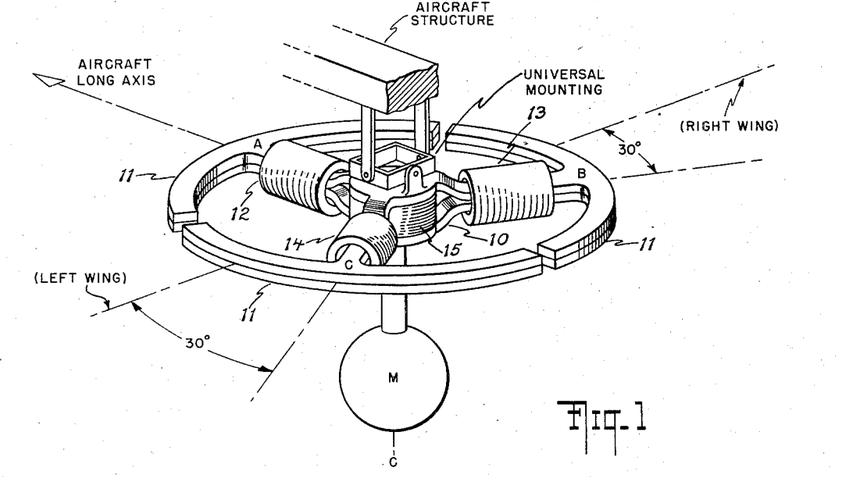
Fig. 1 is a schematic illustration of a typical magnetic field detection device of the flux valve type.

Referring now to Fig. 1 there is schematically illustrated a flux valve compass or magnetic field detector. As illustrated it consists of a sensitive core element or spider 10 of high permeability metal such as a nickel-iron alloy having a generally Y-shaped configuration, the legs or arms of which are preferably arranged 120° apart. Suitable horns 11 are provided for collecting the magnetic lines of flux and concentrating them in the legs of the spider 10 as illustrated and described in the above-noted Patents No. 2,383,460 and 2,383,461. The spider 10 is provided with a central winding 15 which is excited with 400-cycle, single phase supply voltage which serves cyclically to vary the reluctance of the core material, that is to periodically saturate and unsaturate the core material, and thereby effectively "open" and "close" the valve to any magnetic field in the vicinity of the valve. Mounted on each leg of the flux valve is a pick-up or output windings 12, 13, and 14 in which is generated a voltage each time the valve is opened and closed by the excitation voltage. Thus, the output of each winding will be an 800-cycle alternating voltage proportional in amplitude to the magnitude of the component of the magnetic field which lies substantially collinear to the axis of the pick-up coil. The output windings 12, 13 and 14 are preferably connected in Y and their respective output leads 16, 17 and 18 are connected respectively with the three windings of the stator of synchro control transformer 2 (Fig. 3). It will be noted that in order to isolate the control transformer 2 from any D. C. currents in the flux valve legs, large value capacitances are provided in series with each of the leg outputs.

In order that the flux valve windings sense only the horizontal component of the magnetic field in its vicinity the entire sensitive element 10—13 is mounted for freedom with respect to the craft or vehicle roll and pitch axes by means of a universal mounting or Hooke's joint connecting the sensitive element to the supporting structure and the sensitive element is rendered pendulous by means of a mass M. In the present embodiment of the invention, the three legs are designated generally at A, B and C and these legs are oriented with respect to the craft such that leg A is parallel to the fore and aft of the craft, leg B extends generally toward the right wing and leg C extends generally toward the left wing. Thus, the flux valve Cartesian coordinate system may be defined by the three mutually perpendicular axes $a$, $b$ and $c$ (Fig. 2) wherein axes $a$ and $b$ are horizontal and point forwardly and toward the right wing, respectively, and axis $c$ points normally vertically downward.

Since the flux valve pick-up windings are sensitive to any horizontal component of any magnetic field in its vicinity, the output thereof will be in error if any field but the earth's magnetic field is present. Therefore, since it is desired that the flux valve output be proportional only to the magnitude and direction of the horizontal component of the earth's magnetic field, all other fields in the vicinity of the flux valve must be rendered ineffective. Also, since it is desired to measure only the horizontal component of the earth's field, it is necessary to compensate for any vertical components of the earth's field when the flux valve is caused to become unlevel.

As above pointed out, by placing the flux valve of Fig. 1 in the earth's magnetic field, it will be seen that with the flux valve legs disposed in a horizontal plane, the induced voltages in the pick-up windings on legs A, B and C will be proportioned only to the horizontal components of a total magnetic field in the vicinity of the flux valve and errors in the output thereof can and will exist, if uncompensated, under two conditions, ($a$) when the total earth's field and hence its horizontal component is distorted in the vicinity of the valve and ($b$) when the flux valve is tilted out of the horizontal plane. The errors produced by ($a$) above may arise from a number of causes the principal one of which is the magnetic field generated or produced by the aircraft itself, that is, by ferromagnetic bodies which constitute many structural members of the aircraft and its component equipments. Since the distortion of the magnetic field in the vicinity of the flux valve by ferromagnetic bodies decreases rapidly with increased distance from the flux valve, it is therefore mounted as far away from these bodies as possible. However, aircraft types and design criteria make the location of the flux valve a compromise in any practical situation and for a precision compass system means must be provided for compensating for these distortion or deviation errors. Other sources of error within the aircraft which cause field distortion are present and, although small and in many instances negligible, they too may be compensated for by the apparatus of the present invention. Such minor errors may be caused by magnetic fields surrounding direct current carrying cables, ground return currents in the aircraft skin and errors generated as the aircraft changes attitude. Most of the above errors may be considered as static errors, that is, they are, in general, of a predetermined constant magnitude and direction with respect to the aircraft.

When the aircraft is airborne the flux valve output may be in error any time it becomes unlevel. Since the flux valve legs are maintained horizontal by means of a pendulum, errors in the output thereof will occur whenever any acceleration forces act on the pendulous mass. Such accelerations will be effective any time the aircraft changes speed or course and for that matter whenever the aircraft is airborne because of the effect of the acceleration of Coriolis. This latter acceleration is the most bothersome since it is of a continuous nature whereas craft accelerations are generally of a transient nature. However, the apparatus of the present invention will serve to compensate for all of these acceleration errors.

Figure 2:
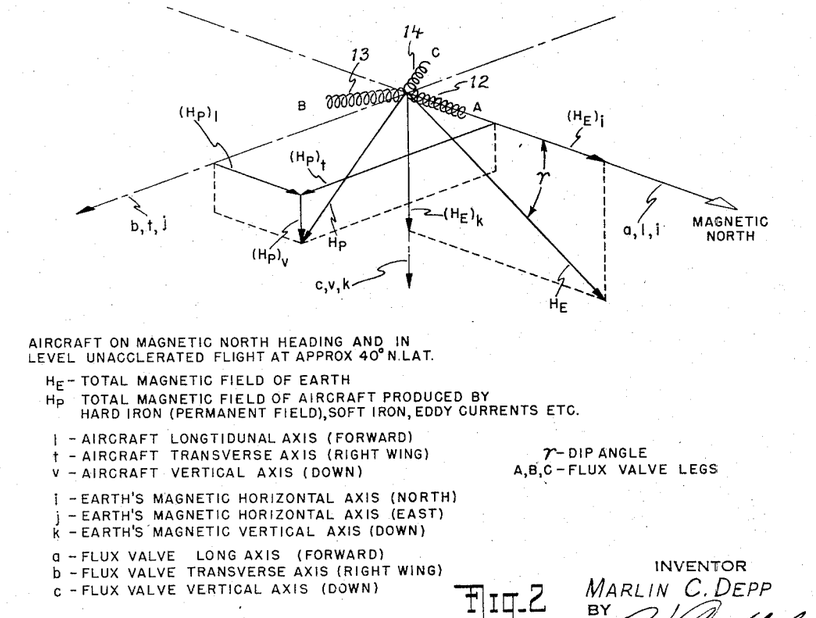
Fig. 2 is a composite diagram of various magnetic fields and their effective components in the vicinity of the flux valve.

Referring now to Fig. 2 there is illustrated a composite diagram of three Cartesian coordinate systems: the earth's system, defined by the coordinates $i$, $j$, and $k$ where $k$ lies along the true or gravity vertical and $i$ and $j$ along horizontal directions and therefore define the horizontal plane; the craft's system defined by the coordinates $l$, $t$, and $v$, wherein $v$ lies along the craft's vertical axis and $l$ and $t$ are respectively the longitudinal and transverse craft axes and define a reference plane in the aircraft; and the flux valve's system defined by the coordinates $a$, $b$ and $c$ wherein $c$ normally lies along the gravity vertical, $a$ lies in the direction of leg A, and $b$ is at right angles thereto (since the *a, b* plane contains the sensitive element, only magnetic vector components in the *a, b* plane can be detected by it. Although all these coordinate systems are dynamically independent and can move relatively to each other, they are for convenience illustrated as being coincident. In other words, the aircraft is assumed to be flying in straight and level, unaccelerated flight on a north heading at approximately 40° N. latitude. In a rigorous mathematical analysis of all possible magnetic fields affecting the flux valve, those field disturbances which are related to the earth such as diurnal and secular changes in the magnetic vector, and local magnetic disturbances produced by magnetic fields which are independent of the aircraft, are referred to the earth's coordinate system and should be considered. However from a practical standpoint, these errors are generally of little significance both statically and dynamically and are not considered in the present case. The magnetic fields which originate in the aircraft such as permanent "hard iron" magnetic fields, induced or "soft iron" fields, fields produced by direct current cables, and eddy current fields are referred to the aircraft's coordinate system. It can be shown that all of the above aircraft fields but the hard iron fields are of little significance and are not considered here. However, the hard iron or permanent field is by far the largest and produces the greatest error in the flux valve output if not compensated. All extraneous fields in the earth's coordinate system and those in the aircraft's coordinate system may be mathematically related to the flux valve coordinate system by use of direction cosines so that the total error in the flux valve output can be accurately calculated. However, for the sake of brevity the development of the general error equation can be omitted from the present discussion, it being believed sufficient for a clear understanding of the present invention to consider only the qualitative effect of the error causing magnetic fields fixed with respect to the aircraft, the movement of these fields with respect to the flux valve, and the effect of movement of the flux valve itself with respect to the aircraft and the total magnetic field of the earth.

It will therefore be evident from an inspection of Fig. 2 that the component $(H_E)_l$ is the horizontal component of the earth's magnetic field which is detected by the horizontally disposed flux valve windings, 12, 13 and 14 and that upon tilting of the flux valve out of the horizontal plane by acceleration forces acting on the pendulum mass M, the flux valve will sense a portion of the vertical component $(H_E)_k$. Likewise, the permanent field of the aircraft $H_P$ will produce horizontal components $(H_P)_l$ and $(H_p)_t$ and these error components will be sensed by the flux valve windings and produce corresponding errors in its output. Further, if the aircraft changes its position about its roll and/or pitch axes, the flux valve will detect a portion of the vertical component of the craft's field $(H_P)_v$.

Figure 5A:
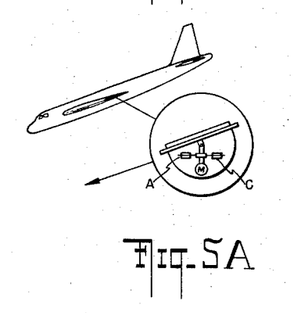
Figure 5B:
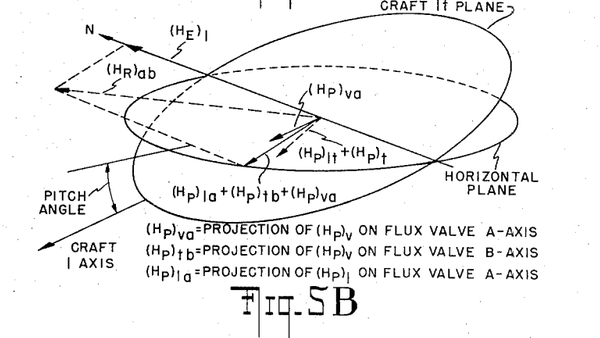
Figures 6A, 6B:
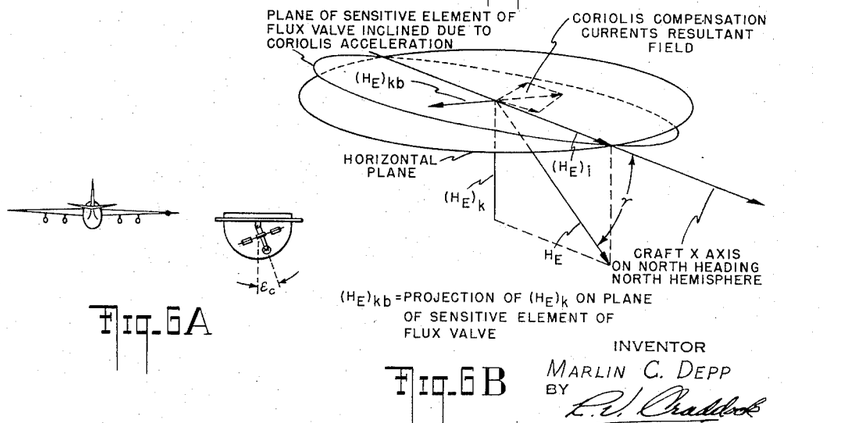
Figure 7A:
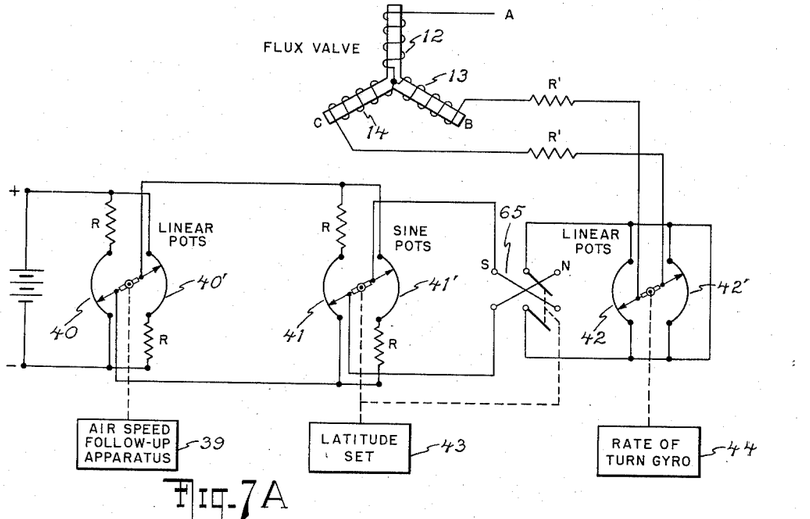
Figs 7A and 7B are schematic illustrations of apparatus for compensating a flux valve for aircraft accelerations acting on the pendulum which normally maintains the flux valve sensitive elements in the horizontal plane.
Figure 7B:
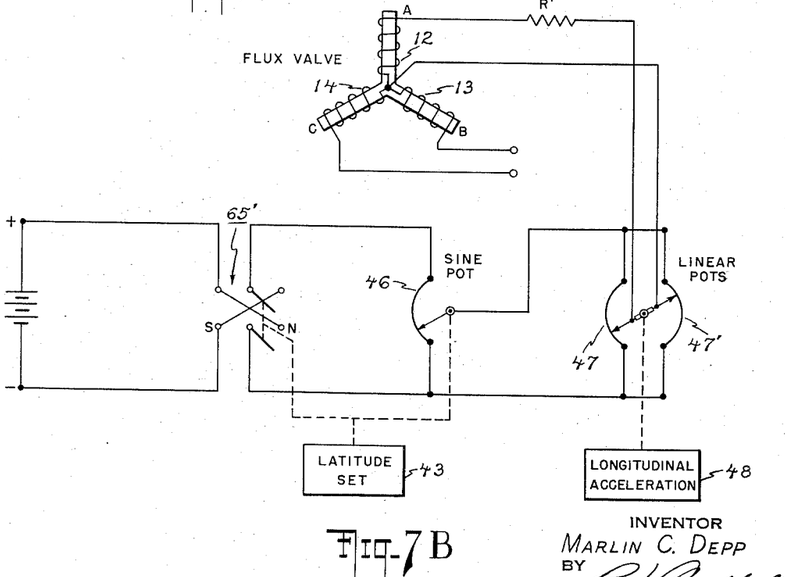

These errors are considered to be the most significant and in Figs. 4A, 4B, 5A, 5B, 6A, 6B these errors are separately illustrated and in Figs. 3, 7A and 7B those means by which these errors may be compensated are shown.

Figure 4A:
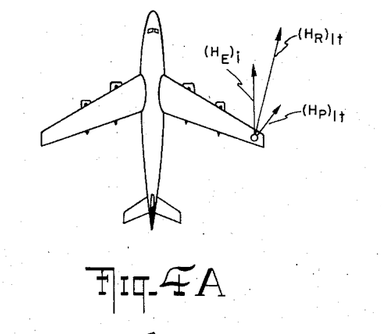
Figs. 4A, 4B, 5A, 5B, 6A and 6B illustrate schematically some of the more important errors in a flux valve compass system, their causes and their effects on the output of the flux valve.
Figure 4B:
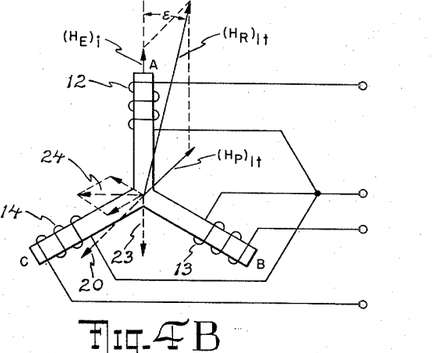

Referring now to Figs. 3, 4A, and 4B the error component $(H_P)_{lt}$ produced by the craft's permanent or hard iron field and its effect on the horizontal component of the earth's field to produce the resultant field $(H_R)_{lt}$ is illustrated. This field has a magnitude and direction which may be determined in a conventional manner, i. e., by ground swinging the aircraft. Preferably, the determination of this deviation error is in accordance with the teachings of my above mentioned copending joint application S. N. 567,203.

To compensate this erroneous component it is necessary to produce an equal field component 20 of opposite sense. Heretofore, this compensation has been accomplished by means of small adjustable magnets located in the vicinity of the flux valve or by means of separate coils located adjacent the flux valve. These former compensators have practical disadvantages which have been overcome by the apparatus of the present invention. In the former case the proper positioning of the small magnets required ready accessibility to the flux valve, while in the latter case considerable space and precise positioning is required for the external coils. By means of the present invention this error component is compensated by introducing or supplying controlled direct current voltages to the flux valve pick-up or output windings themselves such that the windings under the influences of these D. C. voltages generate the compensating magnetic field. Thus, the illustrative error component $(H_R)_{lt}$ of Figs. 4A and 4B is compensated by resultant field 20 produced by supplying a D. C. voltage to winding 12 by means of East-West potentiometer 21 (Fig. 3). This potentiometer is energized from a source 50 of precisely regulated D. C. voltage such as to generate a component field illustrated by the dotted vector 23 of Fig. 4B. Similarly a magnetic field component illustrated by the dotted vector 24 is produced by means of ganged North-South, similarly energized, potentiometers 25, 26 (Fig. 3) which supply corresponding direct current voltages to windings 13 and 14 respectively for producing the component fields in directions required to generate the field component 24. A resultant field 20 is therefore produced which is effectively equal and opposite to the error producing field $(H_P)_{lt}$ and thereby removes the latter's effect upon the alternating current signal output of the flux valve.

The regulated direct current supply is conventional and comprises an input transformer excited from a preferably 400 cycle A. C. supply 51 the secondary of which is connected with a bridge rectifier 52. The D. C. output of rectifier 52, after suitable smoothing is precisely regulated by means of a conventional voltage regulator tube 53. The regulated D. C. voltage is applied across voltage divider 54 having a center tap connected to the common junction of the Y connected windings 12, 13, and 14 of flux valve 1. The potentiometers 21, 25 and 26 of the deviation error compensator 60 are connected in parallel with the positive and negative output on leads 59, 59' of supply 50. Thus, positive or negative voltages may be supplied to any of the windings 12, 13 and 14 by adjustment of the wipers 21', 25' and 26' of potentiometers 21, 25 and 26 away from their center or neutral positions. It should be noted that ganged potentiometers 25, 26 supply equal and opposite D. C. voltage to the windings 13 and 14 so that the vector sum of the fields generated thereby can produce a resultant field of any desired magnitude that is always at right angles to the field produced by the D. C. voltage supplied to winding 12 (see Fig. 4B). Thus, the magnitude and orientation of the compensating resultant field at the flux valve may be adjusted throughout 360° in the plane of the windings thereof. Suitably calibrated dials and knobs are provided on compensator 60 for conveniently setting in the required compensating voltages. In accordance with a feature of the present invention, the compensator 60 may be located in the pilot's compartment of the aircraft and all adjustments may therefore be made remotely from the flux valve and once the flux valve is properly installed no further access thereto is required. Furthermore, no external or space consuming auxiliary compensating coils are needed since in accordance with the present invention, the compensation fields are produced by the pick-up windings themselves.

As stated, the magnitude and direction of the direct current voltage applied to the windings of the flux valve are determined by ground swinging the aircraft in a manner set forth in my above-noted joint application. While ground swinging is usually performed with the aircraft substantially level, the compensation will not be correct in flight when the aircraft maneuvers about its roll and pitch axis. This is of course because the aircraft's magnetic field causing the error in the flux valve output changes its position as the aircraft changes its position with respect to the flux valve and results principally from the vertical component of aircraft magnetism $(H_P)_v$. This is illustrated in Figs. 5A and 5B wherein the aircraft is shown for illustrative purposes, on a westerly heading and in pitch down attitude, while the sensitive element of the flux valve is maintained horizontal by the pendulous mass M. A similar effect occurs if the aircraft is unlevel in roll. Referring to Fig. 2 it will be noted that with small or moderate changes in the pitch or roll attitude of the aircraft the influence of the components $(H_P)_l$ and $(H_P)_t$ in the $a$ and $b$ axes of the flux valve is not changed appreciably since the influence of these vectors is varying as a cosine function of the pitch angle. However, the influence of $(H_p)_v$ in the $a$ and $b$ axes of the flux valve which varies as the sine of the pitch angle, produces a large change in the A leg for small pitch angles. This effect is illustrated in Fig. 5B wherein $(H_p)_{va}$ represents the projection of the $(H_p)_v$ component on the flux valve $a$-axis, this component lying in the horizontal plane, and $(H_p)_{tb}+(H_p)_{la}$ represent the projections of the $(H_p)_t$ and $(H_p)_l$ components on the flux valve $b$ and $a$ axes respectively, the components $(H_p)_t$ and $(H_p)_l$ lying in the aircraft tilted plane $lt$. The resultant component $(H_p)_{la}+(H_p)_{tb}+(H_p)_{va}$ combines with the horizontal field component of the earth $(H_E)_i$ to produce a resultant component $(H_R)_{ab}$ which is, of course, in error. Therefore, as the craft pitches, a compensating voltage must be produced to cancel the effect of the error causing resultant component $$(H_p)_{la}+(H_p)_{tb}+(H_p)_{va}$$

A similar effect takes place when the roll attitude of the craft changes from level flight.

The effect of these attitude errors may be compensated by means of the present invention wherein direct current voltages proportional to the pitch and roll attitude of the aircraft are supplied by pitch and roll signal generators 55 and 56 on a vertical gyro 57 (Fig. 3). As shown in Fig. 3 selected voltage levels of the signal outputs of pitch and roll signal generators 55 and 56 are demodulated at 58 and 58' and the resultant direct current voltages proportional thereto are supplied to the affected legs of the flux valve. As shown in Fig. 3 the pitch compensation signal is applied to the A winding in series with the E. W. deviation compensation voltage and the roll compensation signal to the B and C windings is applied in parallel with the N–S deviation compensation output voltages. It will be understood that the resistances in the demodulator 58' serve as isolation resistances and are therefore larger than the resistances R' in the B and C leg supply leads. In this manner the vertical gyro 57 automatically changes or varies the compensating voltages in accordance with the roll and pitch attitude of the aircraft. Thus, by the apparatus of the present invention, the output of the windings of a flux valve may be compensated for the resultant permanent magnetic field produced by the aircraft itself and changes in the position of this field with respect to the flux valve as the aircraft rotates about its roll and pitch axes may also be compensated by supplying controlled direct current voltage proportional to these determinable errors to the affected legs of the flux valve.

As mentioned above, errors will be generated in the flux valve whenever the flux valve is caused to become unlevel; the error components in this case being caused by the sensing of a portion of the vertical component $(H_E)_k$ of the earth's magnetic field. Accelerations acting on the pendulous mass M will cause such an unlevel condition of the flux valve. In modern jet aircraft capable of flying at very high speeds and high latitudes, the most significant acceleration error experienced is that due to the acceleration of Coriolis, since this acceleration is effective whenever the aircraft is airborne and is hence of a persistent nature. It is well known that straight and level flight of an aircraft over the earth's surface is actually a flight in a curved path due to the earth's rotation. A freely hanging pendulum within an aircraft, such as the mass M that holds the flux valve horizontal, will respond to an acceleration force known as Cariolis acceleration which will cause the pendulum to hang off from the gravity vertical by an angle dependent upon the velocity of the aircraft along its curved flight path, the acceleration of gravity and the latitude of the aircraft. The error in the output of the flux valve caused by the Coriolis acceleration-induced pendulum hang-off is dependent first, on the angular magnitude of the pendulum hang-off, second on the magnitude of the earth's vertical field component $(H_E)_k$, third on the magnitude of the earth's horizontal field component $(H_E)_i$, and fourth on the cosine of the aircraft's magnetic heading. As the aircraft is in flight and because of the Coriolis acceleration, a persistent tilt of the pendulum exists such that the pendulum hang-off is to the right of the ground track in the northern hemisphere and, correspondingly, to the left of the ground track in the southern hemisphere. It will be understood that cross winds may be neglected and for the angular errors involved here flight path and ground track may be considered synonymous and therefore the pendulum hang-off may be referred to the aircraft's curved flight path. Thus, to continue the explanation of the error, as the aircraft is in flight on a northerly heading in the northern hemisphere with a persistent hang-off of the flux valve pendulum to the right of the flight path because of the Coriolis acceleration (see Fig. 6A wherein the aircraft is flying away from the viewer) the earth's vertical field component $(H_E)_k$ will have a component which projects along the flux valve $b$ direction. Thus, the resolved component of the earth's vertical field $(H_E)_k$ appearing in the plane of the flux valve sensitive element will have a magnitude equal to the product of $(H_E)_k$ and the sine of the pendulum hang-off angle. This is the error producing field component in the plane of the flux valve caused by the acceleration of Coriolis which, in vector summation with $(H_E)_i$, produces a heading error in the output of the flux valve. Although a northerly flight path has been described by way of explaining the flux valve error due to Coriolis acceleration, it will be understood that flight paths on other headings in both northern and southern hemispheres of the earth will result in a similar error in the output of the flux valve due to Coriolis acceleration, save only that the error producing field component in the plane of the flux valve, for the particular flight path and geomagnetic location, in vector summation with $(H_E)_i$ at the particular location will result in an error whose angular magnitude in the output of the flux valve bears a cosinusoidal relation to the aircraft's magnetic heading. Now, since the pendulum hang-off is directly related to aircraft velocity along the flight path and to the sine of the geographic latitude, and since charts are available which relate the earth's magnetic field dip angle to geographic coordinates, it is possible to compute the flux valve heading error due to Coriolis acceleration as follows:

$$E_c = \frac{\overbrace{\frac{2\omega_E \cdot V \cdot \sin \lambda}{g}}^{\text{pendulum hang-off due to acceleration of Coriolis}} \cdot \overbrace{\tan \gamma}^{\text{magnetic dip angle of earth}} \cdot \cos \Omega \text{ in degrees}} \quad (1)$$

wherein
$\omega_E$=earth's angular velocity
$V$=velocity of the aircraft along the flight path
$\lambda$=geographic latitude of the aircraft
$\gamma$=dip angle of the earth's magnetic field
$\Omega$=magnetic heading of the aircraft's ground track However, use of this equation for computation of the Coriolis error is awkward since the magnetic dip angle varies widely over the earth's surface. Moreover, a simpler expression is derivable to clarify the relation of the disturbance field component in the plane of the flux valve to the horizontal field component $(H_E)_i$ as the aircraft's geographic position changes.

Analysis of geomagnetic data as given, for example, on U. S. Navy Hydrographic Office charts H. O. 1700, 1701, and 1702 has shown that the dip angle and the horizontal intensity of the earth's magnetic field vary in a similar manner with respect to geographic coordinates. Moreover, if mean or average values of the varying dip angle and horizontal intensity are taken, it is possible to express the magnetic dip angle as a function of geographic latitude and horizontal field intensity. Thus, $$\gamma = \tan^{-1}\frac{(H_E)_k}{(H_E)_i} = \tan^{-1}\frac{K \sin \lambda}{(H_E)_i} \quad (2)$$

expresses the dip angle as a function of geographic latitude and horizontal field intensity. By substitution of Equation 2 in Equation 1 a simple expression results, viz $$E_c = \frac{\overbrace{\frac{2\omega_E \cdot V \cdot \sin \lambda}{g} \cdot K \sin \lambda}^{\text{disturbance field component in the plane of the flux valve due to Coriolis acceleration}}}{\underbrace{(H_E)_i}_{\substack{\text{horizontal component} \\ \text{of the earth's} \\ \text{magnetic field}}}} \cdot \cos \Omega \text{ in degrees} \quad (3)$$

where $K$ is a constant.

Now it can be clearly seen from Equation 3 that the flux valve heading error due to the acceleration of Coriolis is due to a disturbance field in the plane of the flux valve which is a function only of aircraft velocity along the flight path, and geographic latitude, and craft heading and may be expressed as follows:

$$E_c = CV \sin^2 \lambda \cos \Omega$$

where $C$ = a constant. This distrubance field has a constant magnitude independent of aircraft heading (since the flux valve rotates with the craft) for a given velocity along the flight path and latitude. Further, it will be appreciated that any method which substantially reduces the disturbance field to zero while the aircraft is in flight will serve to nullify the Coriolis acceleration error. Therefore, application of a controlled direct current voltage to coils 13 and 14 of the flux valve of a magnitude proportional to the product of the aircraft velocity along the flight path and the square of the sine of the aircraft position in latitude will nullify the Coriolis acceleration error in the output of the flux valve. To this end, in Figs. 6A, 6B and 3, the effect of Coriolis acceleration and the means by which the error caused thereby is compensated are shown. A direct current voltage preferably proportional to the ground speed of the aircraft is developed across ganged potentiometers 35, 35' by means of power supply 50 and manually settable knob 34 (Fig. 3). Of course an automatic air speed follow-up system may be employed for accomplishing automatic compensation since in this case the error between air speed and ground speed is not critical. However, since Mach speed is very nearly the same as ground speed a Mach meter follow-up system may also be provided for adjusting potentiometers 35, 35'. The D. C. voltage output from the wipers of potentiometers 35, 35' is applied across the windings of the ganged potentiometers 36, 36', the wipers of which are positioned in accordance with the latitude at which the aircraft is flown as by means of manually settable knob 38. Potentiometer windings 36, 36' are wound in accordance with a $\sin^2$ function such that the voltage output on the wipers thereof is proportional to the craft velocity (V) times the square of the sine of the latitude $(\sin^2 \lambda)$. The resistances R are provided for preserving circuit balance. This D. C. voltage is applied to windings 13 and 14 of the flux valve such that the magnitude of the resultant magnetic field produced thereby just cancels the effect of the sensed portion of the vertical component of the earth's magnetic field on the horizontal component thereof. Since Coriolis acceleration effect is present whenever the aircraft is airborne its compensation is of prime importance and the apparatus just described provides a simple and accurate means for effecting such compensation.

Whenever the aircraft changes course or changes speed, acceleration forces will tend to tilt the flux valve out of the horizontal plane and again the flux valve windings will sense a portion of the vertical component of the earth's field. The errors in the compass output produced thereby can be compensated in a manner similar to the Coriolis compensation described above. Such a compensation is illustrated in Figs. 7A and 7B. Lateral accelerations such as centripetal accelerations encountered during turns cause the windings 13 and 14 of the flux valve to sense a portion of the vertical component of the earth's magnetic field and hence in order to eliminate this error, a D. C. voltage proportional to a product of the centripetal acceleration and the sine of the geographic latitude (since this latter measure is substantially proportional to dip angle, as above) are supplied to the flux valve windings 13 and 14. For this purpose a D. C. voltage proportional to air speed is supplied by ganged linear potentiometers 40, 40' which are driven in opposite sense through an air speed follow-up system 39 of a conventional form, the output of which is applied across ganged sine potentiometers 41, 41' the wipers of which are positioned in accordance with the latitude of the aircraft. Since the compensating voltage is a function of latitude, a polarity reversal is required when flying from the northern to the southern hemisphere. For this purpose a double-pole-double-throw switch 65 is provided. This switch may be caused to be actuated from one position to the other when the latitude set knob is adjusted through zero degrees of latitude. It will be noted that the air speed potentiometers 40, 40' are ganged and that the resistors R are inserted into the air speed and latitude potentiometer circuits for the purpose of maintaining circuit balance. The product of the speed and latitude voltages is applied to a pair of ganged, linear potentiometers 42, 42' the wipers of which are positioned in opposite sense in one direction or the other in accordance with the direction and rate of turn of the aircraft as measured, for example, by a rate of turn gyro 44. The resultant voltage on the wipers of potentiometers 42, 42' is therefore proportional to the product of the centripetal acceleration (being proportional to $\omega V$, where $\omega$ is rate of turn and V is velocity) and the magnitude of the earth's vertical field component $(H_E)_k$, and these voltages are applied to the windings 13 and 14 of the flux valve through isolation resistances R'. It will be understood that lateral acceleration of the aircraft could be measured directly by means of a stabilized lateral accelerometer rather than by computation of centripetal accelerations as above.

Longitudinal accelerations of the aircraft will cause the winding 12 of the flux valve also to sense a portion of the vertical component of the earth's field and in order to compensate the flux valve output for this error, a D. C. voltage is supplied through reversing switch 65' to energize latitude potentiometer 46, the windings of which are wound in accordance with a sine function to thereby provide a voltage output thereof substantially proportional to the magnitude of the vector $(H_E)_k$. The wiper of potentiometer 46 is positioned in accordance with the latitude of the aircraft as above by means of latitude set 43. The voltage from the wiper of potentiometer 46 is applied across the windings of ganged linear potentiometers 47, 47', the wipers of which are positioned in accordance with the output of a preferably stabilized, longitudinal accelerometer 48. The accelerometer output is adapted to drive the potentiometer wipers in one direction or the other for accelerations of one sense or the other. Thus, the compensating voltage applied through isolation resistance R' to windings 12 of the flux valve is proportional to the magnitude of the vertical component of the earth's field and the longitudinal acceleration of the craft and this voltage generates a field in the vicinity of the flux valve which will nullify the effect of the sensed vertical component of the earth's field whereby to compensate the flux valve output for any longitudinal acceleration acting on a pendulous mass M.

It will be noted in Figs. 7A and 7B, that sources of D. C. supply separate from that for the hard iron, Coriolis, and attitude compensators are provided. These separate sources are preferred because the errors produced by centripetal and longitudinal accelerations are generally much larger than the hard iron, Coriolis, and attitude errors and hence require heavier compensating currents. Furthermore, the provision of separate D. C. sources simplifies intercircuit isolation problems. While I have shown batteries as the D. C. source for the latter compensators, it will be understood that a separate winding on the supply transformer of D. C. supply 50 of Fig. 3 may be employed, this separate winding energizing a separate rectifier and regulator.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. In apparatus for determining the direction of the earth's magnetic field which includes a magnetometer-type device having a pick-up winding for sensing that component of a total magnetic field in the vicinity of said device which is substantially collinear with the axis of said winding and for producing an output voltage proportional thereto, said sensed component including a component of the earth's magnetic field and error components produced by errors in the direction of the total magnetic field of determinable magnitude and direction, means for compensating said output voltage for said error components comprising means for producing a unidirectional voltage proportional in polarity and magnitude to said determinable error components, and means for applying said unidirectional voltage to said pick-up winding in a sense such that said winding under the influence of said unidirectional voltage produces a magnetic field in the vicinity of said device which opposes the error components of said total magnetic field.

2. An apparatus for determining the direction of the earth's magnetic field which includes a flux valve compass of the type having a plurality of angularly disposed pick-up windings for sensing those components of the total magnetic field in the vicinity of the flux valve which are substantially collinear with the axes of said windings and for producing an output voltage in each winding respectively proportional thereto, said sensed components including components of the earth's magnetic field and error components produced by errors in the direction of said total magnetic field of determinable magnitude and direction, means for compensating said output voltages for said error components comprising means for producing a plurality of unidirectional voltages proportional in direction and magnitude to said determinable error components, and means for applying components of said latter voltages to each of said pick-up windings in a polarity and magnitude such that said windings under the influence of said unidirectional voltages produce magnetic fields in the vicinity of said flux valve which oppose the error components of said total magnetic field.

3. Apparatus for determining the orientation of a vehicle with respect to the earth's magnetic field comprising a flux valve compass having a plurality of angularly disposed, coplanar, pick-up windings pendulously supported in said vehicle for providing a plurality of periodically varying output voltages of phase and magnitude proportional respectively to the direction and magnitude of those normally substantially horizontal components of the total magnetic field in the vicinity of said flux valve which are substantially collinear with the windings thereof, said components including not only the horizontal components of the earth's magnetic field but also determinable error components produced by magnetic fields in the vehicle itself and by motions of the flux valve with respect to said total magnetic field, means for compensating said flux valve for said error components comprising means for producing unidirectional voltages proportional in magnitude and polarity to said determinable error components, and means for applying said unidirectional voltages to the affected pick-up windings in a magnitude and polarity such that said windings produce a resultant magnetic field which opposes said error components of said total magnetic field.

4. Apparatus for compensating the output of a flux valve magnetic compass for errors in the components of the total magnetic field in the vicinity of said flux valve sensed by the windings thereof, which errors are produced by components of stray magnetic fields of determinable magnitude and direction produced by a supporting vehicle comprising means for producing unidirectional voltages of magnitude and direction proportional to said determinable error components, and means for supplying said unidirectional voltages to the affected windings of said flux valve in a sense such as to generate magnetic field components in the vicinity of said flux valve which oppose said error components whereby said flux valve windings are responsive only to the components of the earth's magnetic field.

5. In a flux valve compass system for determining the heading of a supporting vehicle with respect to the earth's magnetic field and including a flux valve pendulously supported in said vehicle for freedom about the roll and pitch vehicle axes such that said flux valve is maintained substantially horizontally disposed in space and the windings thereof are sensitive only to the horizontal components of the total magnetic field in the vicinity of said flux valve, said total magnetic field being the resultant of the earth's magnetic field and any magnetic field produced by the vehicle itself of fixed orientation with respect to the vehicle whereby said horizontal components sensed by said flux valve windings will be in error in an amount dependent upon the magnitude and direction of said fixed field, the combination comprising, means for producing unidirectional voltages proportional in magnitude and direction to said error components, means for supplying said unidirectional voltages to said flux valve windings in a sense such as to generate a magnetic field in the vicinity of said flux valve which will be equal and opposite to the error components of said fixed field produced by said vehicle, and means for varying said unidirectional voltages in accordance with changes in the attitude of said vehicle whereby to compensate said flux valve for the changing orientation of the vehicle's field.

6. In a flux valve compass system for determining the heading of a supporting vehicle with respect to the earth's magnetic field and including a flux valve universally and pendulously supported in said vehicle for freedom about the roll and pitch axes of said vehicle such that said flux valve is maintained substantially horizontal in space and the windings of said flux valve normally are sensitive to only the horizontal components of the total magnetic field in the vicinity of said flux valve but also are sensitive to vertical components of the total magnetic field upon accelerations of said vehicle which tend to rotate said flux valve about the roll and pitch axes of said vehicle whereby to produce errors in the pick-up windings of said flux valve dependent upon the magnitude and direction of said accelerations, the combination comprising, means for producing unidirectional compensating voltages in the magnitude and direction of which are determined in accordance with the product of said vehicle accelerations and the latitudinal position of the vehicle, and means for supplying said compensating voltages to the affected windings of said flux valve in a sense such as to generate a magnetic field in the vicinity of said flux valve which will be equal and opposite to said sensed vertical field components whereby to compensate said flux valve or the errors induced therein by said vehicle accelerations.

7. Apparatus as set forth in claim 6 wherein the means for producing said compensating voltages includes a source of unidirectional voltage, means for varying said voltage in accordance with the latitudinal position of said vehicle, means responsive to longitudinal acceleration of said vehicle for further varying said voltage in accordance therewith, and means for combining said varied voltages so as to produce a resultant voltage proportional to the product thereof.

8. Apparatus as set forth in claim 6 wherein the means for producing said compensating voltages include a source of unidirectional voltage, means for varying said voltage in accordance with centripetal accelerations of said vehicle, means for varying said voltage in accordance with the latitudinal position of said vehicle, and means for combining said varied voltages so as to produce a resultant voltage proportional to the product thereof.

9. Apparatus as set forth in claim 8 wherein said means for varying said unidirectional voltage in accordance with centripetal accelerations of said vehicle includes means responsive to the air speed and rate of turn of said vehicle.

10. In a flux valve compass system for determining the heading of a supporting vehicle with respect to the earth's magnetic field and including a flux valve universally supported in said vehicle for freedom about the roll and pitch axes of said vehicle, pendulous means for maintaining said flux valve substantially horizontal in space whereby the windings of said flux valve normally will sense only the horizontal components of the total magnetic field in the vicinity of said flux valve, apparatus for compensating the output of said flux valve for the effects of Coriolis acceleration on said pendulous means, said apparatus comprising multiplier means for producing a unidirectional voltage variable in magnitude in accordance with the product of vehicle velocity and the square of the sine of the latitudinal position of said vehicle, and means for supplying said unidirectonal voltage to the affected winding of said flux valve.

11. In a flux valve compass system for determining the heading of a supporting vehicle with respect to the earth's magnetic field said system including, a flux valve universally supported in said vehicle for freedom about the roll and pitch axes of said vehicle, pendulous means for maintaining said flux valve substantially horizontal in space whereby the windings of said flux valve normally will sense only the horizontal components of the total magnetic field in the vicinity of said flux valve, apparatus for compensating the output of said flux valve for the effects of Coriolis acceleration on said pendulous means, said apparatus comprising a first input means adapted to be set in accordance with and to provide a first quantity representative of the ground speed of the vehicle, a second input means adapted to be set in accordance with and to provide a second quantity representative of the latitude of the vehicle, multiplying means controlled in accordance with the settings of said input means for supplying a unidirectional voltage output in accordance with the product of said first and second quantities whereby to provide a measure of said Coriolis acceleration at said craft speed and latitude, and means for supplying said unidirectional voltage output to the windings of said flux valve affected by said Coriolis acceleration.

12. Apparatus as defined in claim 11 wherein said multiplying means includes potentiometer means having relatively positionable winding and wiper elements, means for energizing said winding elements with a unidirectional voltage variable in accordance with one of said quantities, and means for positioning the wiper elements of said potentiometer means in accordance with the other of said quantities, whereby said unidirectional voltage output in accordance with said product is supplied at said wiper elements.

13. Apparatus as defined in claim 12 wherein said potentiometer winding elements are wound in accordance with a sine function and wherein said one of said quantities is the quantity representative of vehicle ground speed and said other of said quantities is the quantity representative of the latitude of said vehicle whereby said output voltage varies in accordance with the product of craft ground speed and a sine function of the latitudinal position of said vehicle.

References Cited in the file of this patent

UNITED STATES PATENTS

| | | |
|---|---|---|
| 2,241,499 | Barth | May 13, 1941 |
| 2,585,956 | McCarthy | Feb. 19, 1952 |

FOREIGN PATENTS

| | | |
|---|---|---|
| 624,083 | Great Britain | May 27, 1949 |